(12) United States Patent
Hsu et al.

(10) Patent No.: US 7,002,226 B2
(45) Date of Patent: Feb. 21, 2006

(54) MICROELECTRO MECHANICAL SYSTEM FOR MAGNETO-OPTIC DATA STORAGE APPARATUS

(75) Inventors: Wensyang Hsu, Hsin Chu (TW); Han-Ping Shieh, Hsinchu (TW); Yi Ting Sun, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 106 days.

(21) Appl. No.: 10/793,829

(22) Filed: Mar. 8, 2004

(65) Prior Publication Data

US 2005/0194515 A1   Sep. 8, 2005

(51) Int. Cl.
  *H01L 29/76* (2006.01)
  *H01L 29/94* (2006.01)
  *H01L 31/062* (2006.01)
  *H01L 31/113* (2006.01)
  *H01L 31/119* (2006.01)

(52) U.S. Cl. ..................... 257/414; 438/48

(58) Field of Classification Search ............ 257/414; 438/48
See application file for complete search history.

(56) References Cited

U.S. PATENT DOCUMENTS

| 6,055,220 A | 4/2000 | Mamin et al. ............. 369/112 |
| 6,094,803 A | 8/2000 | Carlson et al. ............ 29/602.1 |
| 6,335,522 B1 | 1/2002 | Shimada et al. ......... 250/201.3 |

*Primary Examiner*—Long Pham
(74) *Attorney, Agent, or Firm*—Troxell Law Office, PLLC (57) ABSTRACT

The present invention relates to a Microelectro mechanical system structure. More specifically the invention relates to utilize a sacrificial layer to fabricate an air bearing structure, followed by forming an aperture, and reducing the aperture to nano-scale by electroplating. And then, by using of two thick film photoresist films for twice electroplating fabrication, for fabricate metal microcoils having high aspect ratio structure and interconnection metal line, to achieve efficiencies of utilizing area and reducing resistance. Moreover, proceed lithography depends on different portions and exposure dose. Then form a single photoresist film to have a specific dimension and thickness structure, finally, by using reflow process, forming a magneto-optic (MO) pickup head comprises of Supersphere Solid Immersion Lens (SSIL), nano-aperture, microcoils and air bearing by using an integrated fabrication, with advantages such as no high cost device and precise apparatus are required in the process of fabrication, mass production in batch fabrication, without step of assembly, for high-density data storage and rewritable record.

9 Claims, 13 Drawing Sheets

MICROELECTRO MECHANICAL SYSTEM FOR MAGNETO-OPTIC DATA STORAGE APPARATUS

REFERENCE CITED

1. U.S. Pat. No. 6,094,803
2. U.S. Pat. No. 6,055,220
3. U.S. Pat. No. 6,335,522 B1

FIELD OF THE INVENTION

This present invention relates to Microelectro mechanical system (MEMS) structure. More particularly, the present invention relates to an integrated process of a magneto-optic (MO) pickup head comprises of Supersphere Solid Immersion Lens (SSIL), nano-aperture, microcoils, and air bearing, which has an optical re-recordable device with high resolution for high-density data storage and rewritable record in optical data storage.

DESCRIPTION OF THE RELATED ART

Information storage and retrieval has become immensely important as a result of the increased need for information exchange in the modern, high technology society of today. The rapidly growing urge for increased access to information has spurred the development of ever larger and faster data storage and retrieval systems. Various kinds of methods are known to minimize the spot size for high-density data storage, optical data storage system is one of the methods, which is used popularly, as this system provides the capability to store large quantities of data on a disk for high-density data storage by using a small data size. In apparatus of an optical data storage system, pickup head is the key component, due to high recording density is determined by the size of spot directly. Wherein, the size of the recorded marks or pits on the disk is limited by the diameter of the focused laser spot on the disk. This spot size is the same as the diameter of the focused optical beam, called as the beam waist size. The waist size of a focused light beam is given approximately by $\lambda/2NA$, where $\lambda$ is the wavelength of the incident light, and NA is the numerical aperture of the lens.

Magneto-Optic (MO) system is one of the erasable optical data storage systems. While Magneto-Optic system reads data by measuring the rotation of the incident polarization caused by the MO media.

The waist size of spot size can be reduced by either using shorter wavelength lasers, such as blue lasers, or by employing higher NA lenses.

Another way to reduce the spot size is through near-field optics, in which a physical aperture is formed which allows light to be transmitted only through the aperture. When an aperture is smaller than the wavelength of the incident light, the spot size of the light passed through the aperture is unrestricted by the diffraction limit but decided by the aperture size. The smaller aperture leads to a smaller spot size when the aperture is smaller than the wavelength of the incident light. A smaller aperture size is fabricated either by using optical fiber tips made in pipette shape or by adopting the FIB (Focused Ion Beam). In 2001, Lane et al. disclosed an over-electroplating method to form a tiny aperture by "electroplating method", wherein the diameter of the aperture was shrunk and defined with the electroplating time.

In 1994, the research group in Stanford University disclosed a new design for optical data storage to reduce the spot size efficiently, as described by Kino, 1994. The concept is added another lens between the objective lens and the recording media, called "Solid Immersion Lens" (SIL). The incident light is focused by the objective lens in advance, and then the incident light will be focused again by the SIL before arriving the media surface. When the incident light enters the SIL, the light velocity will change due to the different material. Therefore, the wavelength of the light will also change in the SIL.

The present invention relates to Microelectro mechanical system (MEMS) structure for magneto-optic data storage apparatus, and it particularly relates to a process of magneto-optic pickup head for near field optical data storage. An integrated process of a magneto-optic (MO) pickup head comprising of Supersphere Solid Immersion Lens (SSIL), nano-aperture, microcoils, and air bearing is disclosed.

According to paper "Super-resolution by combination of a solid immersion lens and an aperture" in *Jpn. J. Appl. Phys. Vol.* 40 (2001) pp. 1778–1782, that discloses a structure combining a solid immersion lens (SIL) and an aperture, a tiny light spot having an effective light spot can be focused by incident light source. The incident light is focused again through solid immersion lens (SIL) after objective lens, and then passes through the aperture. A high concentrated power formed on aperture for outputting light spot through aperture is able to provide better power for writing data on disk by using SIL. In addition, the paper also discloses that accessing signal can be improved by combination of solid immersion lens and an aperture, and then signal contrast is also improved. The device using process of combination of SIL and aperture obtain solid immersion lens and aperture, and then assembly for precise requirement. But the diameter of fabricated SIL is one centimeter and aperture is fabricated by adopting the Focused Ion Beam (FIB). However, this method is known as a high cost and wasting time technique due to only SIL is used to improve optical data storage efficiency in this structure, lacking of efficiency attached by using supersphere solid immersion lens (SSIL) according to the present invention.

A magneto-optic pickup head comprises of an air bearing design, SIL and microcoils, as described by Sookyung Kim et al., "Design and fabrication technology of optical flying head for first surface MO recording", *Optical Memory and Optical Data Storage Topical Meeting* 2002, *International Symposium*, 2002, pp. 204–206. The above apparatus are formed and assembled. Wherein, process of forming SIL is more complicated than the present invention. Not only assembly is needed in whole accomplishment of whole apparatus, but also only SIL is used to improve optical data storage efficiency in this structure. Therefore, this structure is unable to achieve efficiency of using SSIL according to the present invention.

Another attempt to reduce the spot size and to increase the recording area density, as exemplified by the following references:

U.S. Pat. No. 6,094,803, titled "Wafer processing techniques for near field magneto-optical head".

U.S. Pat. No. 6,055,220, titled "Optical disk data storage system with improved solid immersion lens".

As reference to U.S. Pat. No. 6,094,803, by Carl Carlson et al., titled "Wafer processing techniques for near field magneto-optical head", that discloses a designed method for mass producing a magneto-optic pickup head including a numerical aperture (NA) optical focusing device, which comprises of an air bearing structure, micro lens and microcoils, by using wafer processing techiniques. Air bearing design is formed on a substrate such as an alumina layer. And, a flat optical substrate is molded or heat pressed in batches at wafer level to form the desired lens shapes. Microcoils can be simultaneously formed with the lens on same substrate. And then, these two substrates are combined by bonding process. Wherein, microcoils are formed by using thin-film processing techniques, which comprises of metal plug as interconnection metal line for supplying power to microcoils. Only SIL is used to improve optical data storage efficiency in the process of this patent, therefore, it is unable to achieve efficiency of using SSIL according to the present invention.

With reference to U.S. Pat. No. 6,055,220, by Harry Jonathon Mamin et al., titled "Optical disk data storage system with improved solid immersion lens", that discloses an optical pickup head with an air bearing slider supporting a SIL and with a patterned thin film formed on the slider at the focus of the SIL to act as an aperture, for improving effective numerical aperture of optical pickup head and minimizing size of light spot. One issue in optical pickup head structure used for near field recording is the flying height between the pickup head and the disk. Flying height is important to keep the moving pickup head stable at the near field recording. The air bearing design could achieve a stable flying height by the special protruding structure design at the bottom of the pickup head. The structure is identical to U.S. Pat. No. 6,094,803 mentioned above, that only SIL is used to improve optical storage efficiency without efficiency of using SSIL according to the present invention. There are two means to forming an aperture are disclosed according to the patent. Firstly, that precisely combines lithography and etching process to form an aperture on metal thin film in direct. Precise and expensive exposing machine and advanced fabrication technique are needed by this means. Secondly, by scattering pellets of high polymer at bottom of solid immersion lens, followed by depositing metal thin film, and utilize lift-off technique to remove pellets of high polymer, to obtain an aperture. But in this means, there is no specification of controlling position of high polymer, and also unable to sure aperture formed whether can be aligned to focus point of solid immersion lens or not.

Yet another attempt at improving the recording data, as illustrated by the following reference:

U.S. Pat. No. 6, 6,335,522 B1, titled "Optical probe having a refractive index micro-lens and method of manufacturing the same".

As further reference to U.S. Pat. No. 6,335,522 B1, titled "Optical probe having a refractive index micro-lens and method of manufacturing the same", that discloses an optical pickup head comprises of a cantilever, a projection having a micro-aperture and arranged at the free end of the cantilever and a focusing objective lens also arranged at the free end of the cantilever. There are several methods are proposed according to this technique. Wherein, the same characteristic among these methods is two substrates are needed for bonding wafer. This is a complex fabrication, because inaccuracy of aligning happened easily, and also, it is not useful in application of continuous mass production. According to this technique aperture is formed by combining lithography and etching process. Thus, size of aperture is limited by process of lithography and etching. And, technique of processing micro lens according to this patent is by using a mother mold and followed by heat-pressed to the mother mold. But, process of producing a mother mold is too complex. Moreover, when hemisphere-shaped structure obtain outline of pressing mold by using electroplating method to cause some problems such as satisfaction of optical requirement to surface curvature and roughness.

SUMMARY OF THE INVENTION

The main purpose of the present invention is to provide an integrated fabrication of using magneto-optic (MO) pickup head combining supersphere solid immersion lens, nano-aperture, microcoils and air bearing without step of assembly and precise apparatus for high optical data storage and rewritable efficiency.

Another purpose of the present invention is to provide a system having advantages such as mass production in batch process for high optical data storage and rewritable.

For the above purposes, the present invention provides a MicroElectroMechanical System (MEMS) structure for magneto-optic data storage apparatus. The MEMS structure fabrication process comprises the steps of:

Firstly, a material layer is deposited on a substrate, and an air bearing shape is formed on the material layer by lithography and etching, followed by sandwiches a sacrificial layer between the material layer and a deposited dielectric layer.

Secondly, an initial aperture is formed on the dielectric layer by lithography and dry etching. After that, remove specific portions of the sacrificial layer under the aperture by using an etching solution of the sacrificial layer. Followed by a conductive layer is used as an electroplating seed layer that is deposited on the dielectric layer.

Thirdly, an electroplating area defined by photoresist coating and lithography, followed by electroplating metal is used to reduce the initial aperture to nano-scale to form a nano aperture. Then the photoresist mold is removed after reducing aperture step.

Another photoresist film is coated and patterned to form electroplating mold for the following electroplating microcoils process. Then the electroplating process is applied to fabricate microcoils and a second electroplating pad structure. The second electroplating pad connected with all the microcoils structure.

Fourthly, remove the photoresist mold for electroplating microcoils and etch the electroplating seed layer. A new photoresist film is coated again to mantle the microcoils and patterned to form the fillisters structure in the photoresist film by lithography. This coating photoresist film is usually the negative photoresist that can resist the developer of the positive photoresist.

Fifthly, interconnection metal lines are deposited along the fillisters above the microcoils by electroplating again with electroplating power is supplied from the second electroplating pad instead of the etched seedlayer. The last photoresist film is coated again and patterned to form a protruding cylinder-shaped with plate structure located above the nano-aperture. The protruding cylinder-shaped with plate structure formed in the photoresist film is fabricated depending on different mask and exposure dose during the lithography step.

Finally, a supersphere solid immersion lens (SSIL) located above the nano-aperture is formed by reflow process, wherein the protruding cylinder-shaped structure is changed to a sphere-shaped structure. The sacrificial layer is totally being etched with etching solution of the sacrificial layer. And, the substrate is separated.

BRIEF DESCRIPTION OF THE DRAWINGS

The present invention will be better understood from the following detailed description of preferred embodiments of the invention, taken in conjunction with the accompanying drawings, in which.

DESCRIPTION OF THE PREFERRED EMBODIMENTS

The following descriptions of the preferred embodiments are provided to understand the features and the structures of the present invention.

Figure 1:
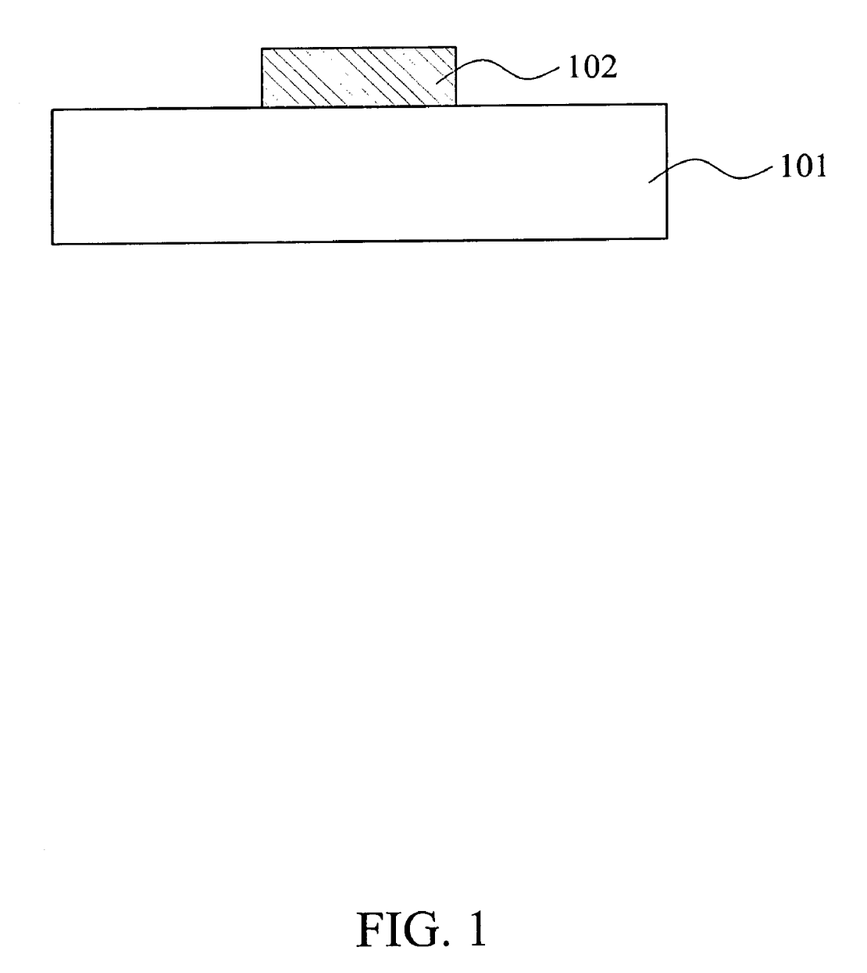
FIG. 1, FIG. 2 and FIG. 3 are views showing step (1) according to the present invention.
Figure 2:
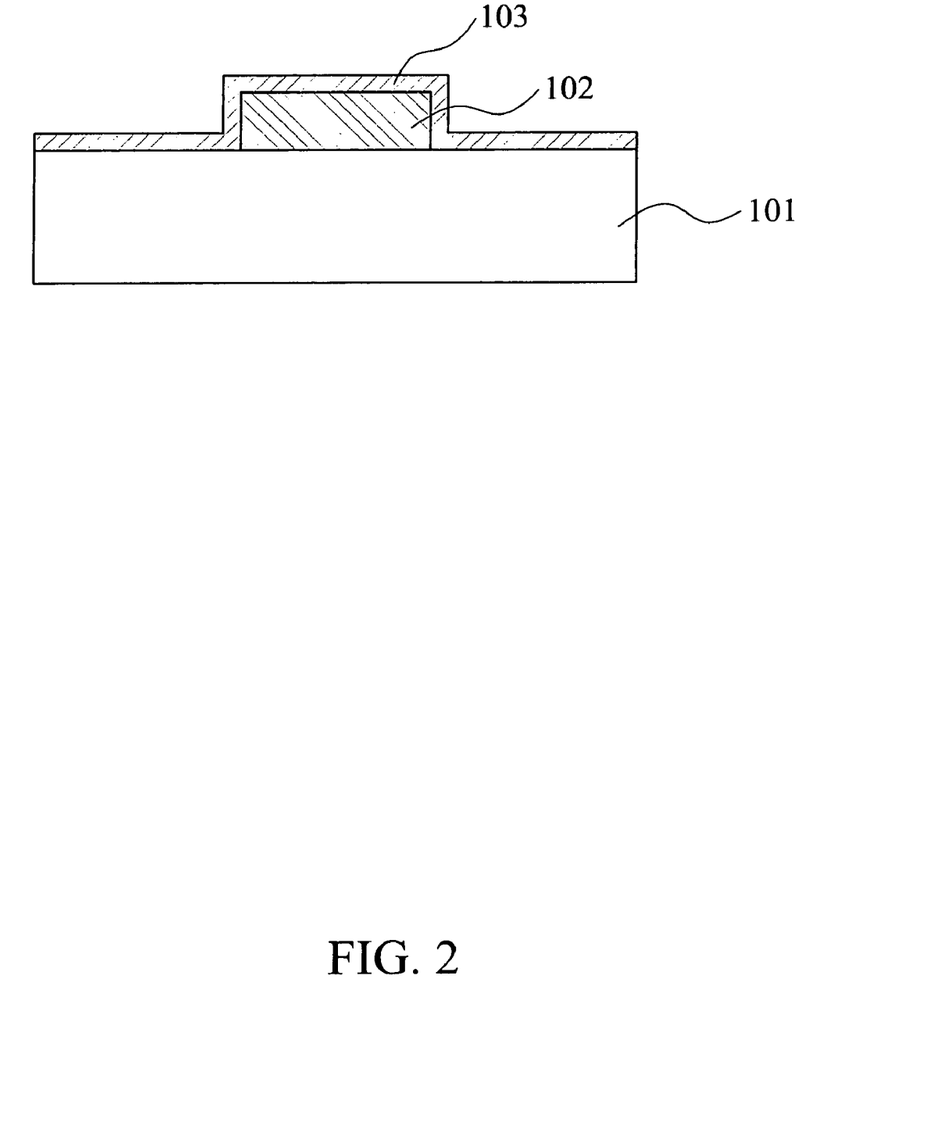
Figure 3:
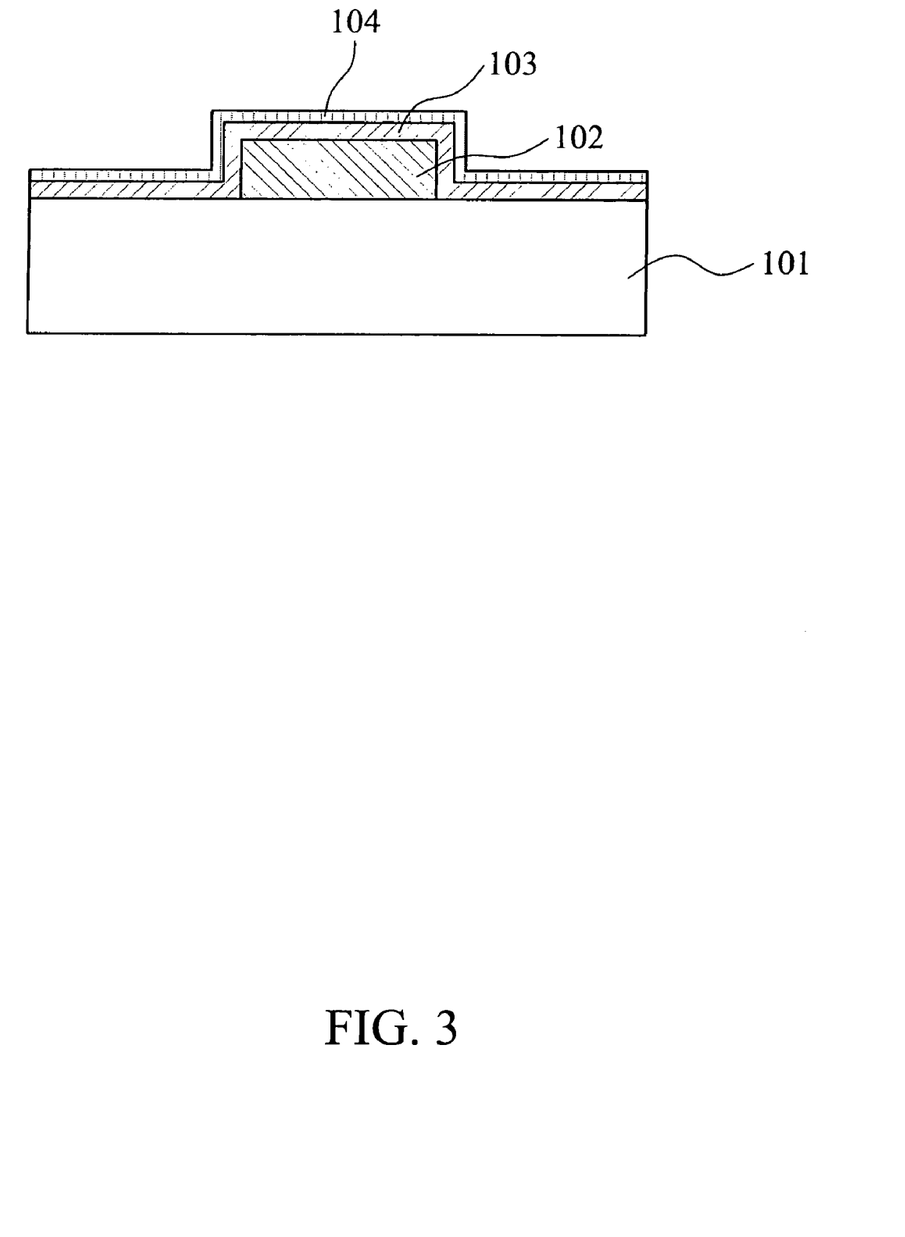
Figure 4:
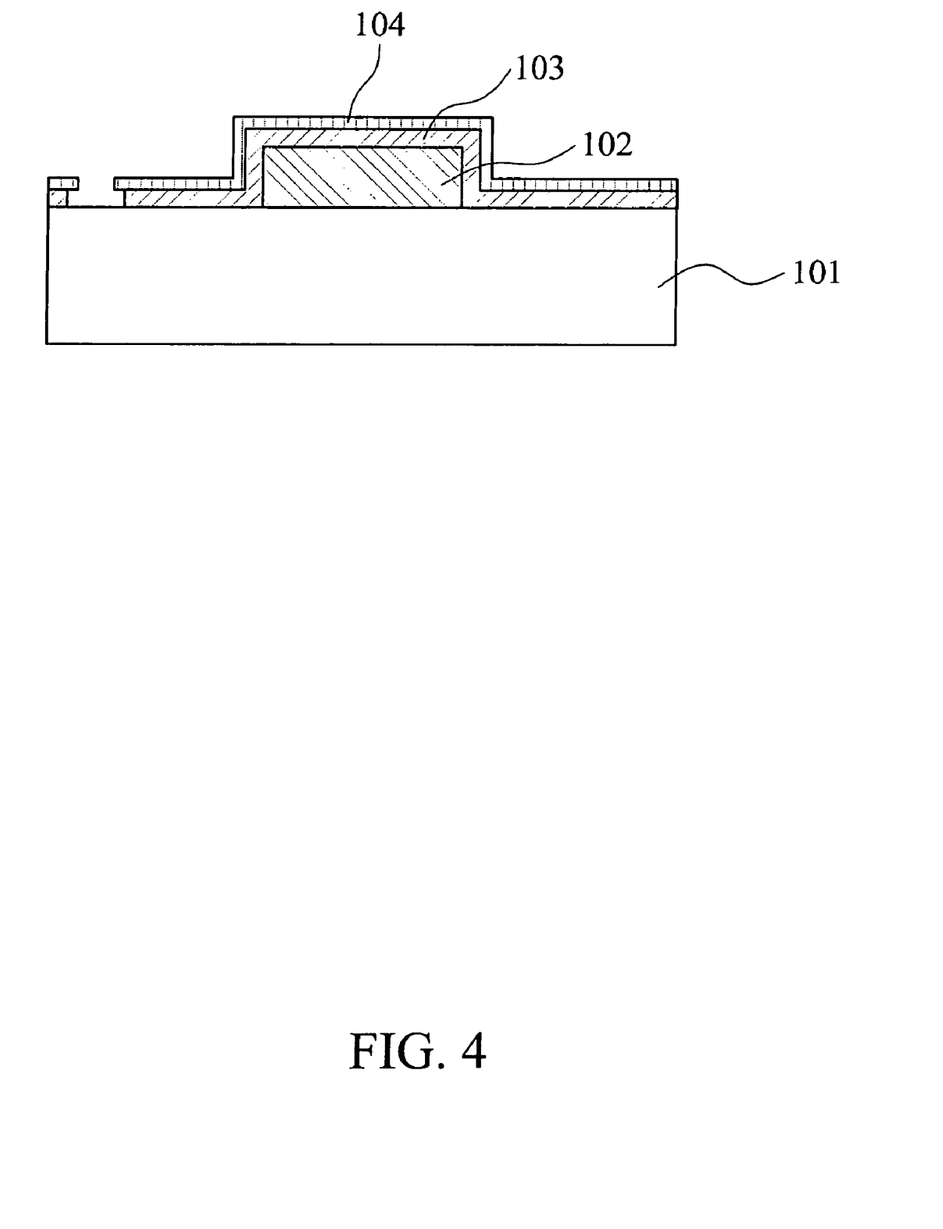
FIG. 4 and FIG. 5 are views showing step (2) according to the present invention.
Figure 5:
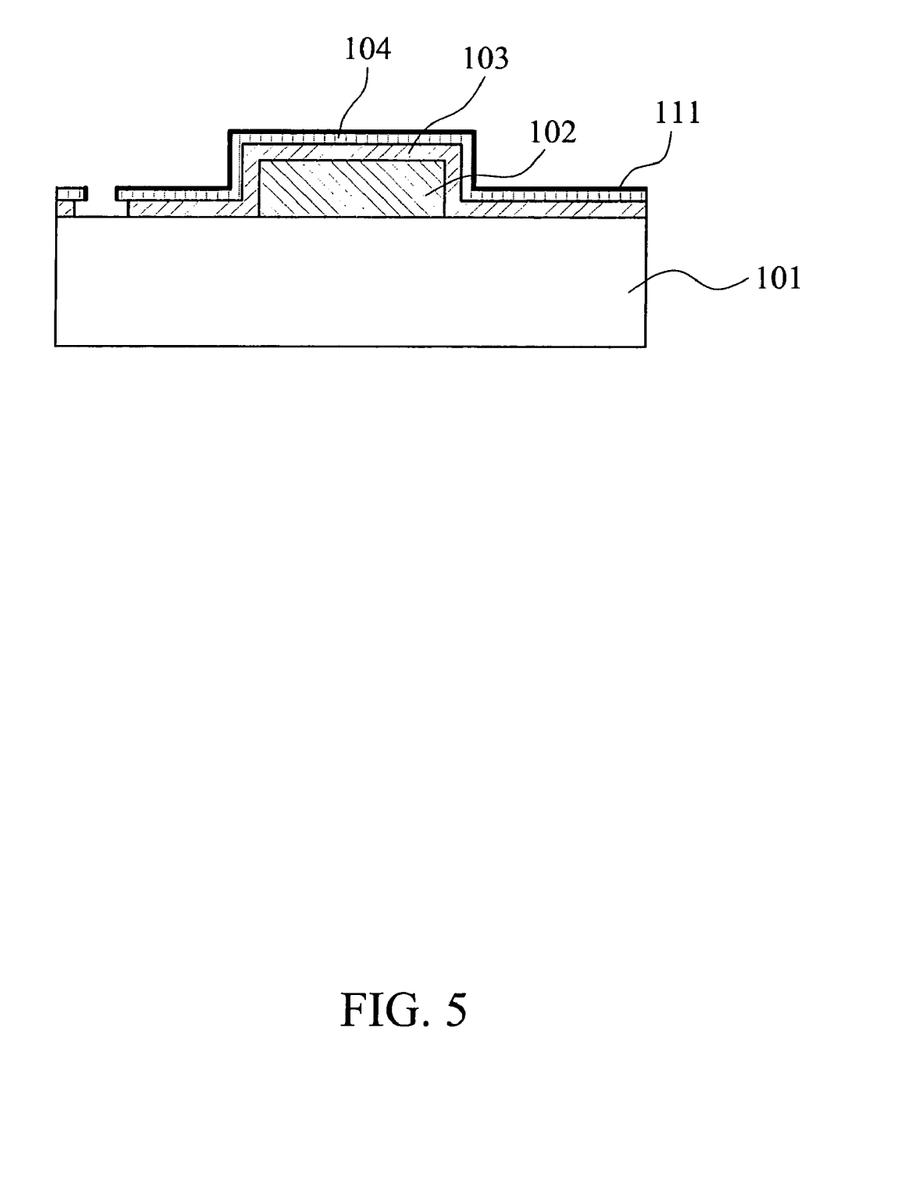
Figure 11:
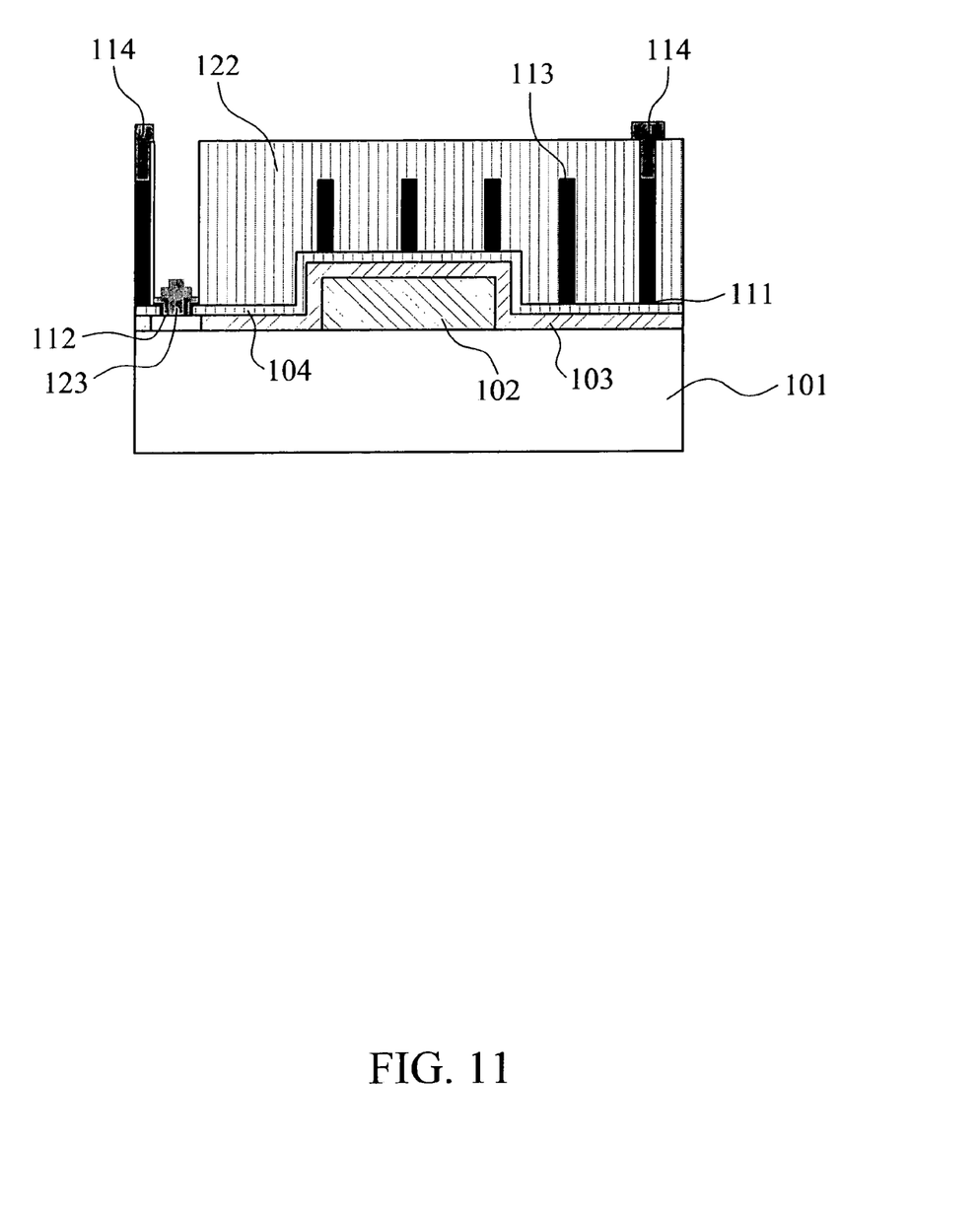
Figure 12:
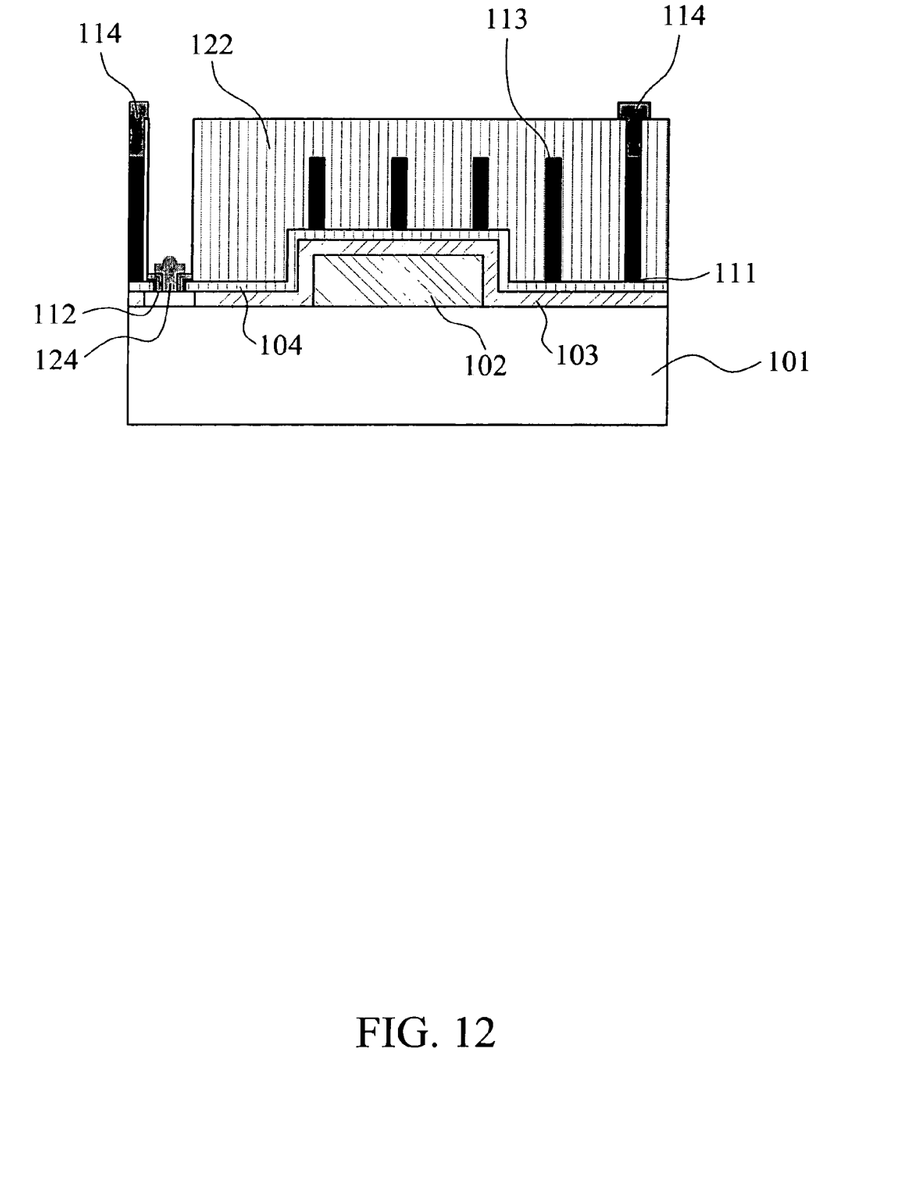
FIG. 12 and FIG. 13 are views showing step (6) according to present invention.
Figure 13:
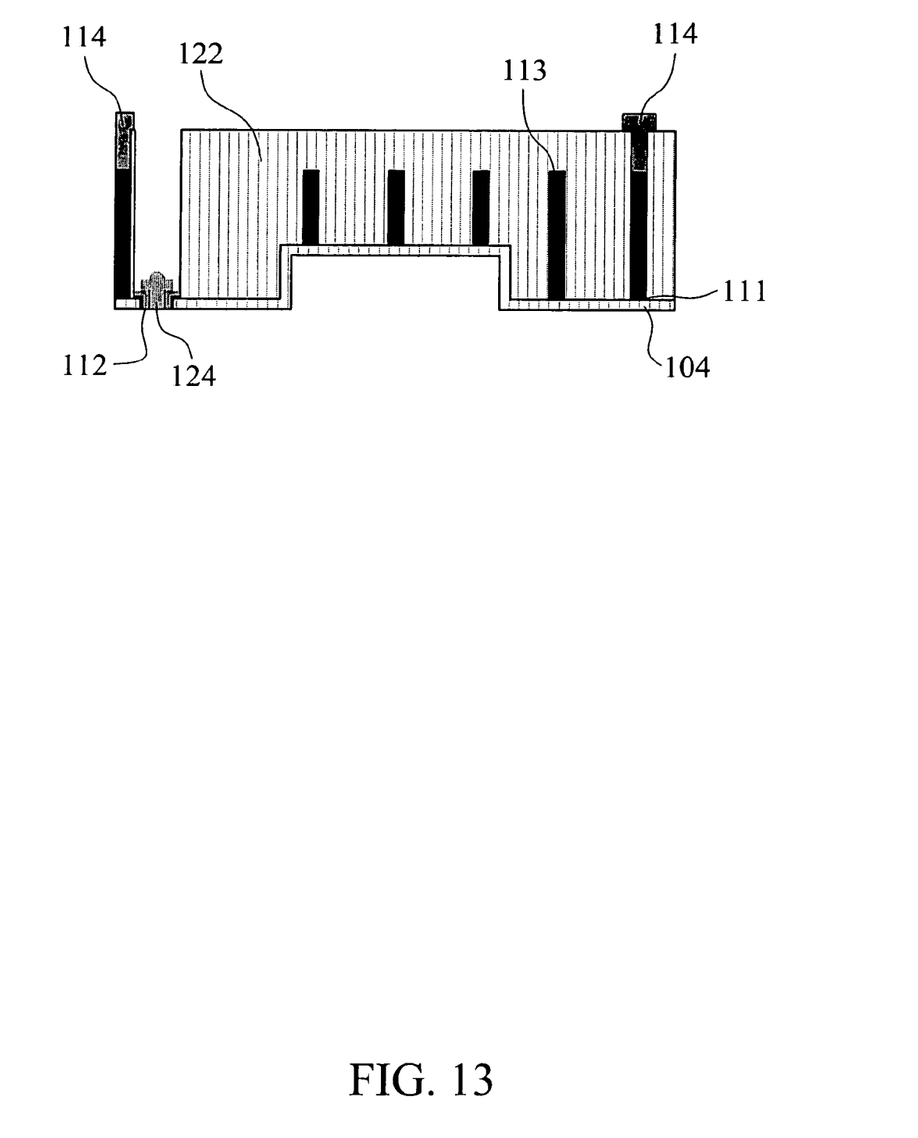

Please refer to FIG. 1 till FIG. 13, these figures showing procedures of Microelectro mechanical system (MEMS) structure for magneto-optic data storage apparatus. FIG. 1, FIG. 2 and FIG. 3 are views showing step (1) according to the present invention. FIG. 4 and FIG. 5 are views showing step (2) according to the present invention.

Figure 6:
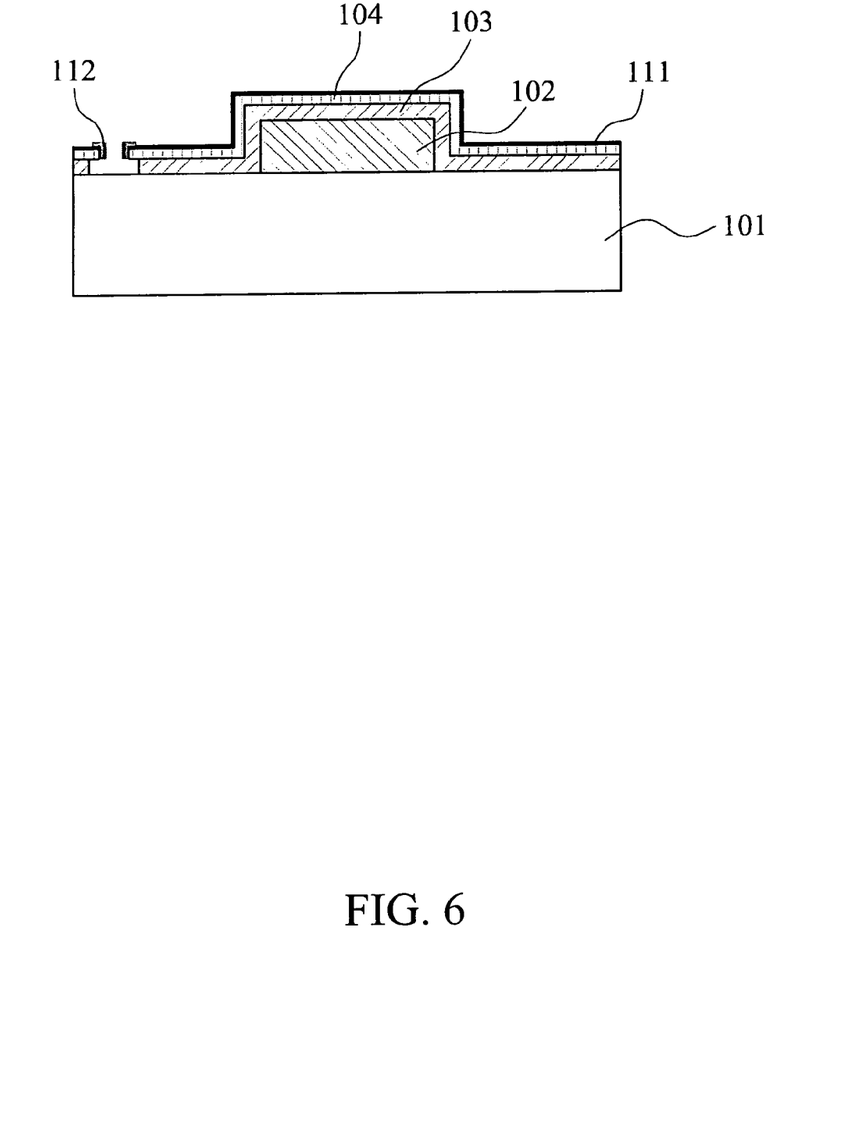
FIG. 6 and FIG. 7 are views showing step (3) according to the present invention.
Figure 7:
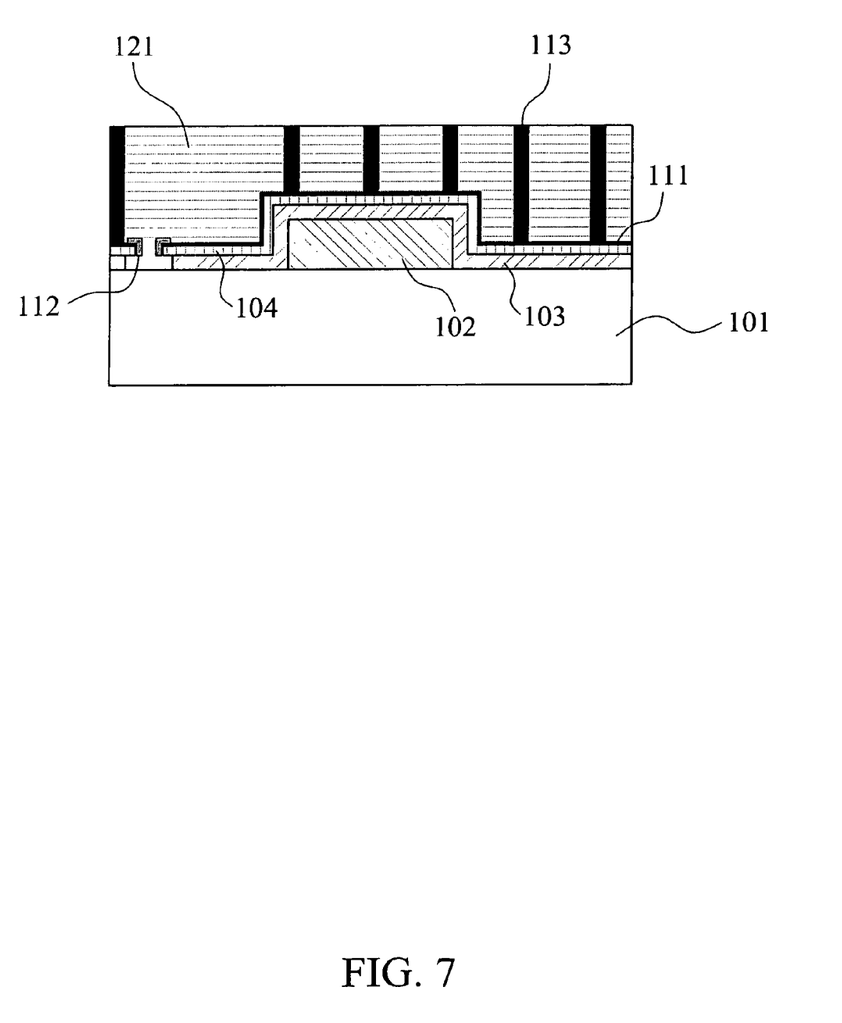
Figure 8:
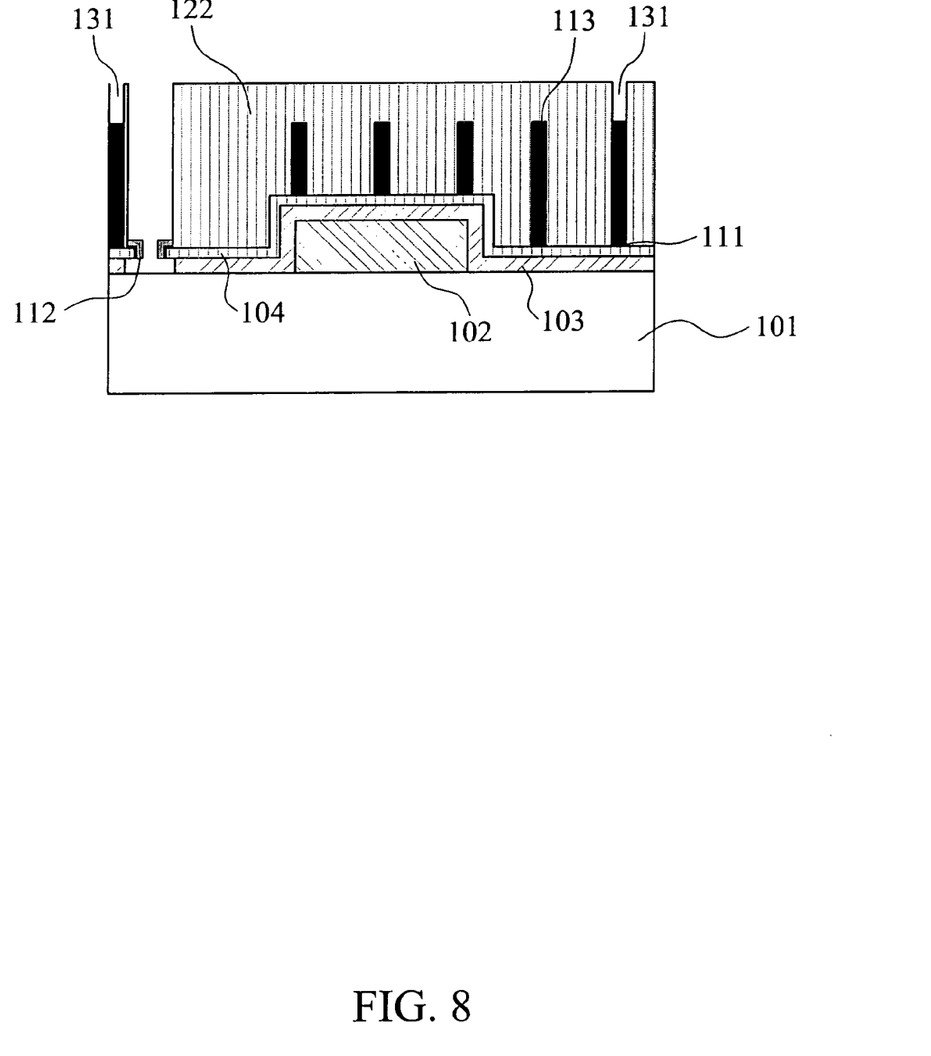
FIG. 8 is a view showing step (4) according to the present invention.
Figure 9:
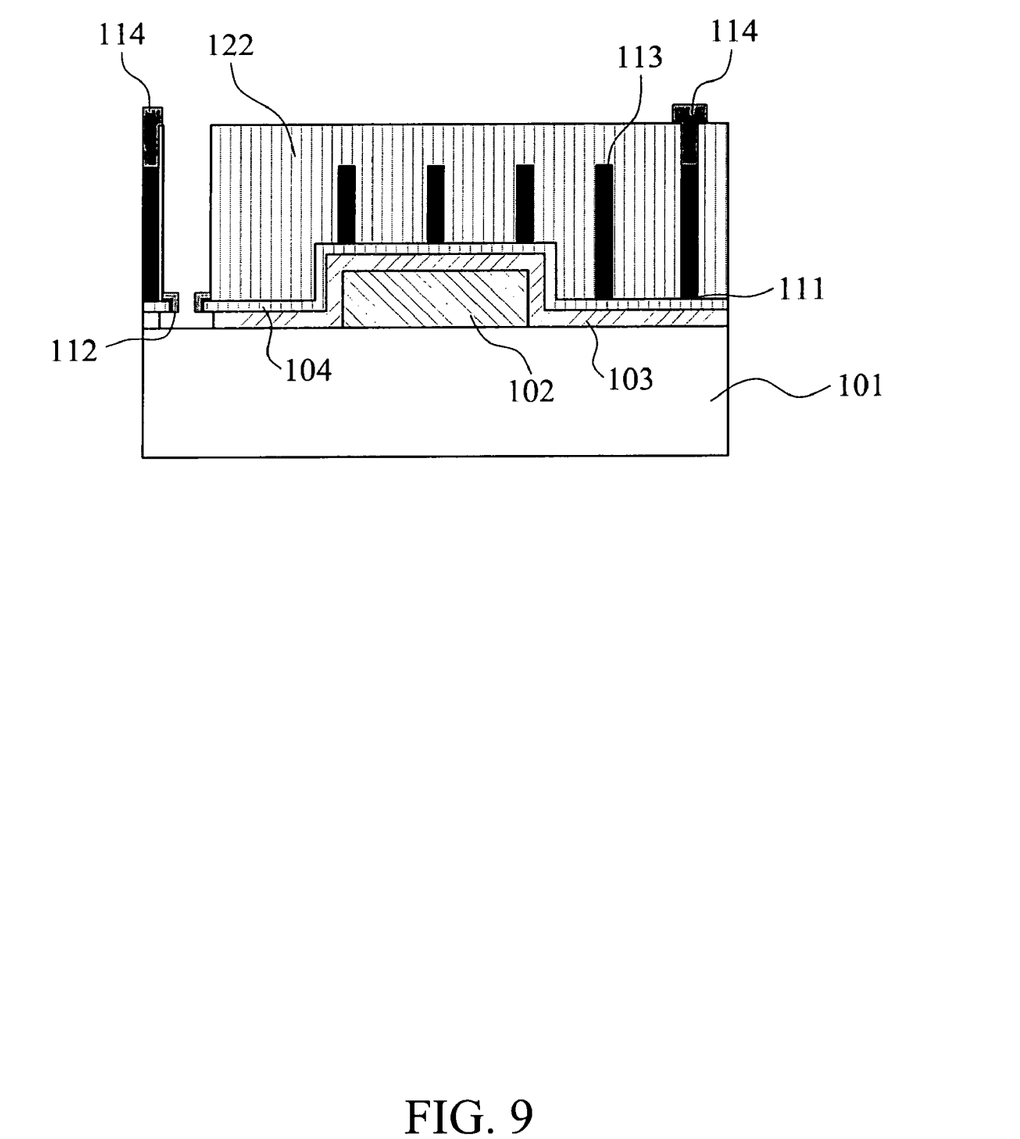
FIG. 9, FIG. 10 and FIG. 11 are views showing step (5) according to present invention.
Figure 10:
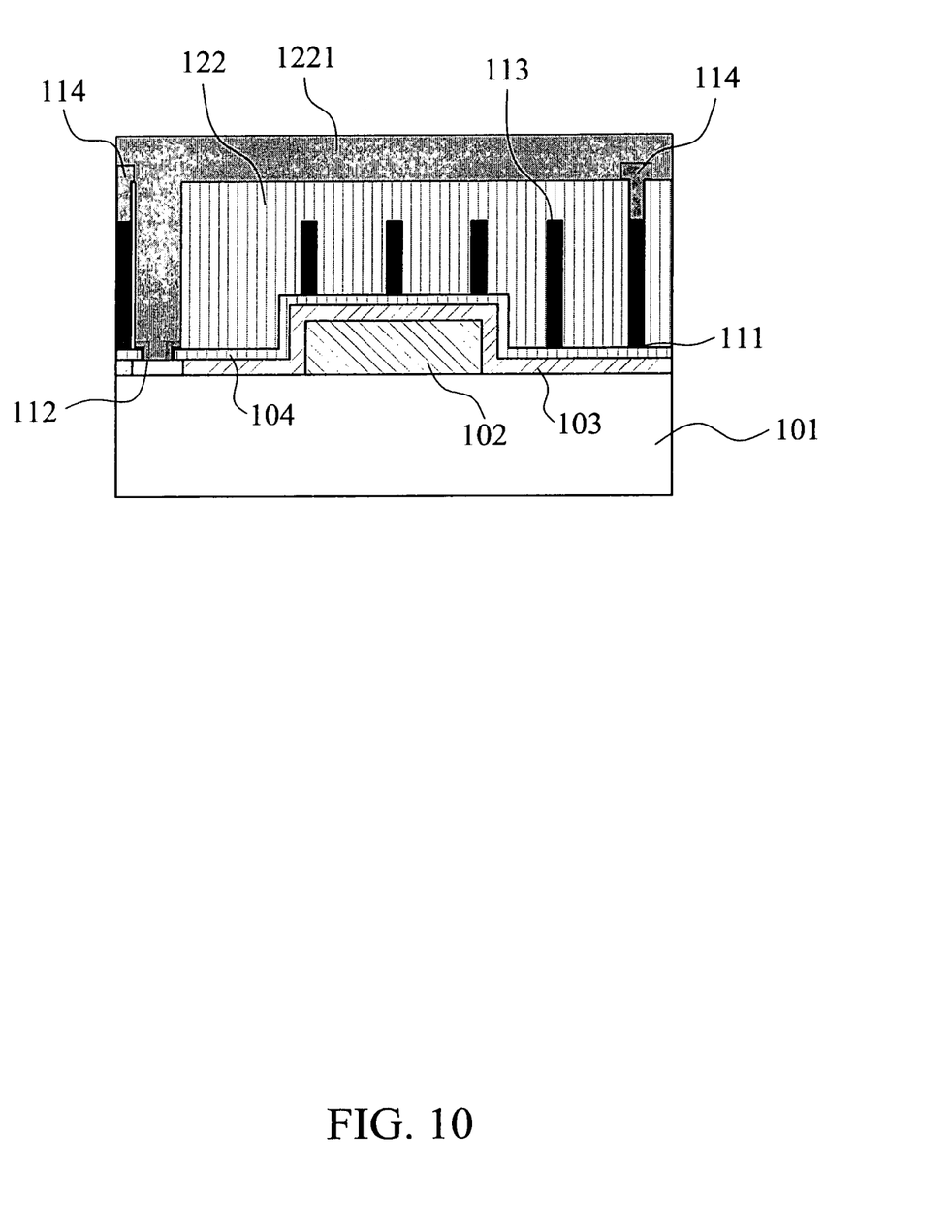

FIG. 6 and FIG. 7 are views showing step (3) according to the present invention. FIG. 8 is a view showing step (4) according to the present invention. FIG. 9, FIG. 10 and FIG. 11 are views showing step (5) according to present invention. FIG. 12 and FIG. 13 are views showing step (6) according to present invention.

In the process of fabricating pickup head for recording optical data, the present invention according to MEMS technology provide a means focusing incident light pre-focused by objective lens again into the nano-aperture by SSIL.

This present process is batch production without assembly to forming a magneto-optic pickup head comprise of supersphere solid immersion lens, nano-aperture, microcoils and air bearing structure. The process comprises the steps of:

step (1): As illustrated in FIG. 1, a material layer 102 is formed on a substrate 101. The material layer 102 can be the silicon dioxide. An air bearing shape is defined on the material layer 102 by using lithography and etching. And then, as reference to FIG. 2 and FIG. 3, sandwiches a sacrificial layer 103 between said material layer 102 and a dielectric layer 104. The sacrificial layer 103 can be the silicon dioxide. So the air bearing structure can be formed at the bottom of the structure after the final release step. Then a dielectric layer 104 is deposited as the pedestal of the total structure. The dielectric layer 104 can be the silicon nitride or amorphous silicon without doping as shown in FIG. 3.

step (2): As further illustrated in FIG. 4, an initial aperture is formed in the dielectric layer 104 by using lithography and dry etching. After that, remove specific portions of the sacrificial layer 103 under the aperture by using an etching solution of the sacrificial layer 103. FIG. 5 illustrates a conductive layer is deposited as an electroplating seed layer 111 above the dielectric layer 104. The sidewall of the initial aperture will also be covered by the deposited metal 111 due to the step coverage.

step (3): With reference to FIG. 6, after an electroplating area defined by photoresist coating and lithography process, electroplating metal 112 is used to reduce the initial aperture to nano-scale to form a nano aperture. As further illustrated in FIG. 7, another photoresist film 121 which is coated and patterned by lithography to form the electroplating mold for microcoils fabrication, with the following electroplating step, microcoils 113 and a second electroplating pad are formed. The microcoils 113 are used to generate magnetic field with supplying power. The second electroplating pad is prepared and connected with all the microcoils structure for the following electroplating interconnection step after etching seedlayer. After the microcoils and second electroplating pad are fabricated, the photoresist film 121 is removed and the seedlayer 111 between the microcoils is etched.

step (4): After etching seedlayer 111, a photoresist film 122 is coated to mantle the microcoils 113. The photoresist film 122 is not attacked by positive photoresist developer, for example is SU-8. The fillisters structure 131 are defined in the photoresist film 122 by lithography.

step (5): With further reference to FIG. 9, interconnection metal lines 114 are deposited along the fillisters 131 above the microcoils 113 by electroplating again with electroplating power supplied from the second electroplating pad. The interconnection metal lines 114 are used to conduct the input source to generate magnetic field. As illustrated in FIG. 10, a last photoresist film 1221 is coated again. The photoresist film 1221 are patterned to form a protruding cylinder-shaped with plate structure 123, as illustrated in FIG. 11. The protruding cylinder-shaped with plate structure 123 is formed from the photoresist film 1221 depending on different mask and exposure dose during lithography.

step (6): As illustrated in FIG. 12, a supersphere solid immersion lens (SSIL) 124 located above the nano-aperture is formed by reflow process, wherein the protruding cylinder-shaped of the structure 123 is changed to a sphere-shaped structure. Incident light pre-focused by objective lens will be focused again into the nano-aperture by supersphere solid immersion lens 124. Finally, with reference to FIG. 13, the sacrificial layer 103 is totally being etched with etching solution of the sacrificial layer 103. The substrate 101 is separated. By the above steps of the present invention, a pickup head for magneto-optic data storage apparatus is formed.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed is:

1. A Microelectro mechanical system (MEMS) structure for magneto-optic data storage apparatus, comprising the steps of:

(1) forming a matarial layer on a substrate, and forming air bearing shape on said material layer by lithoghraphy and etching, and sandwiching a sacrificial layer between said material layer and a dielectric layer;

(2) forming an initial aperture on said dielectric layer by lithography and etching and moving specific portions of said sacrificial layer under said aperture by using an etching solution of said sacrificial layer, and then depositing a conductive layer as an electroplating seed layer on said dielectric layer;

(3) reducing said initial aperture by electroplating metal for forming nano-aperture, and then a photoresist film is coated and patterned by lithography and following electroplating step for forming microcoils and a second electroplating pad is applied, wherein said second electroplating pad electrically connect with said microcoils;

(4) removing the photoresist film of said step (3) and then etching said electroplating seed layer and coating another photoresist film to mantle said microcoils, fillisters are formed in the said photoresist film by lithography;

(5) forming interconnection metal line along said fillisters above said microcoils by electroplating with power supply from said second electroplating pad and removed the photoresist film coated in step (4), then a new photoresist film is coated and patterned to form protruding cylinder-shaped with plate structure above said nano-aperture; and (6) Forming supersphere solid immersion lens (SSIL) above said nano-aperture by reflow process from said protruding cylinder-shaped with plate structure to a sphere-shape structure, and then etching said sacrificial layer with etching solution and separating said substrate.

2. The Microelectro mechanical system structure according to claim 1, further comprise forming a protruding and recessing structure by using lithography and etching on a material layer and then depositing a sacrificial layer on said material layer, then a dielectric layer is deposited above the sacrificial layer, after removing said sacrificial layer, said air bearing can be formed at the bottom of said dielectric layer.

3. The Microelectro mechanical system structure according to claim 1, wherein said material layer can be the silicon dioxide.

4. The Microelectro mechanical system structure according to claim 1, wherein said sacrificial layer can be the silicon dioxide.

5. The Microelectro mechanical System structure according to claim 1, wherein said dielectric layer can be the silicon nitride or amorphous silicon without doping.

6. The Microelectro mechanical system structure according to claim 1, wherein a photoresist film to mantle said microcoils of said step (4) is not attacked by positive photoresist developer.

7. The Microelectro mechanical system structure according to claim 1, wherein said protruding cylinder-shaped with plate structure of step (5) is formed by different mask and exposure dose during lithography.

8. The Microelectro mechanical system structure according to claim 1, wherein said interconnection metal line of step (5) and said microcoils can be the same material.

9. The Microelectro mechanical system structure according to claim 1, further comprising forming said an initial aperture on said dielectric layer by using lithography and etching and removing said sacrificial layer under said initial aperture, and then depositing an electroplating seedlayer for electroplating metal for reducing said initial aperture to nano-aperture.

* * * * *